INVENTOR.
GEORGE M. COULTER

Sept. 28, 1965 G. M. COULTER 3,208,437
INTERNAL COMBUSTION ENGINE
Filed April 2, 1962 4 Sheets-Sheet 3

INVENTOR.
GEORGE M. COULTER
BY John H. Widdowson
ATTORNEY

Sept. 28, 1965 G. M. COULTER 3,208,437
INTERNAL COMBUSTION ENGINE
Filed April 2, 1962 4 Sheets-Sheet 4

INVENTOR.
GEORGE M. COULTER
BY
John H. Widdowson
ATTORNEY

United States Patent Office 3,208,437
Patented Sept. 28, 1965

3,208,437
INTERNAL COMBUSTION ENGINE
George M. Coulter, R.R. 1, Leon, Kans.
Filed Apr. 2, 1962, Ser. No. 184,390
3 Claims. (Cl. 123—13)

This invention relates to an internal combustion engine and in a more specific aspect, to a rotary internal combustion engine. In a still more specific aspect the invention relates to a rotary internal combustion engine having piston means therewith which continuously rotate in the same direction with the piston portions in the cylinders moving and compressing a combustible fuel prior to igniting same and cooperating to discharge exhaust gases from the cylinders.

Various types and constructions of internal combustion engines are known to the prior art. The usual internal combustion engine utilizes one or more cylinders and pistons which reciprocate in the cylinders as a result of the ignition of a combustible fuel therein and are operatively connected to a crankshaft or the like to convert the reciprocating motion of the pistons into a rotary motion for ultimate use. The stopping and starting of the pistons at each end of the cylinders and the conversion of the reciprocatory motion to a rotary motion is highly inefficient. Some rotary internal combustion engines are known to the prior art however, these engines are highly complicated and inefficient in use and have never gained commercial acceptance. In some of these engines the fuel is not adequately compressed at the time of firing to obtain a satisfactory result.

In accordance with the present invention an internal combustion engine is provided which includes means defining two cylinders with the cylinders intersecting each other in a common portion. Two shafts are provided and each of the cylinders has one of the shafts rotatably positioned therein. The engine has two rotors each having an arcuate center portion and piston portions. The rotors are mounted on the shafts with the piston portions movable through the common portion of the cylinders and with the end portions thereof being in close fitting engagement when passing through the common portion of the cylinders. A fuel inlet is provided with one of the cylinders and an exhaust with the other of the cylinders. Means are provided with the other of the cylinders operable to ignite a combustible fuel therein and the engine is constructed and adapted so that a combustible fuel provided through the fuel inlet is ignited in the other of the cylinders to drive the rotor and turn the shaft therein. As a result of applicant's rotary internal combustion construction reciprocating movement of the piston means has been eliminated and the inefficient operation of the engine resulting thereby is prevented.

Accordingly, it is an object of the invention to provide new internal combustion engine means.

Another object of the invention is to provide a new rotary internal combustion engine construction.

Another object of the invention is to provide an improved and simplified rotary internal combustion engine having a minimum of parts.

Another object of the invention is to provide a new rotary internal combustion engine wherein the piston means have end portions thereof which are shaped and of size relative to each other to meet in sliding and close fitting engagement as they pass through a common portion of cylinders holding same.

Another object of the invention is to provide a new rotary internal combustion engine system having a driven shaft operatively connected to a drive shaft to turn two rotor members simultaneously during operation of the engine.

Various other objects, advantages, and features of the invention will become apparent to those skilled in the art of the following description taken in conjunction with the accompanying drawings, in which.

Figure 1:
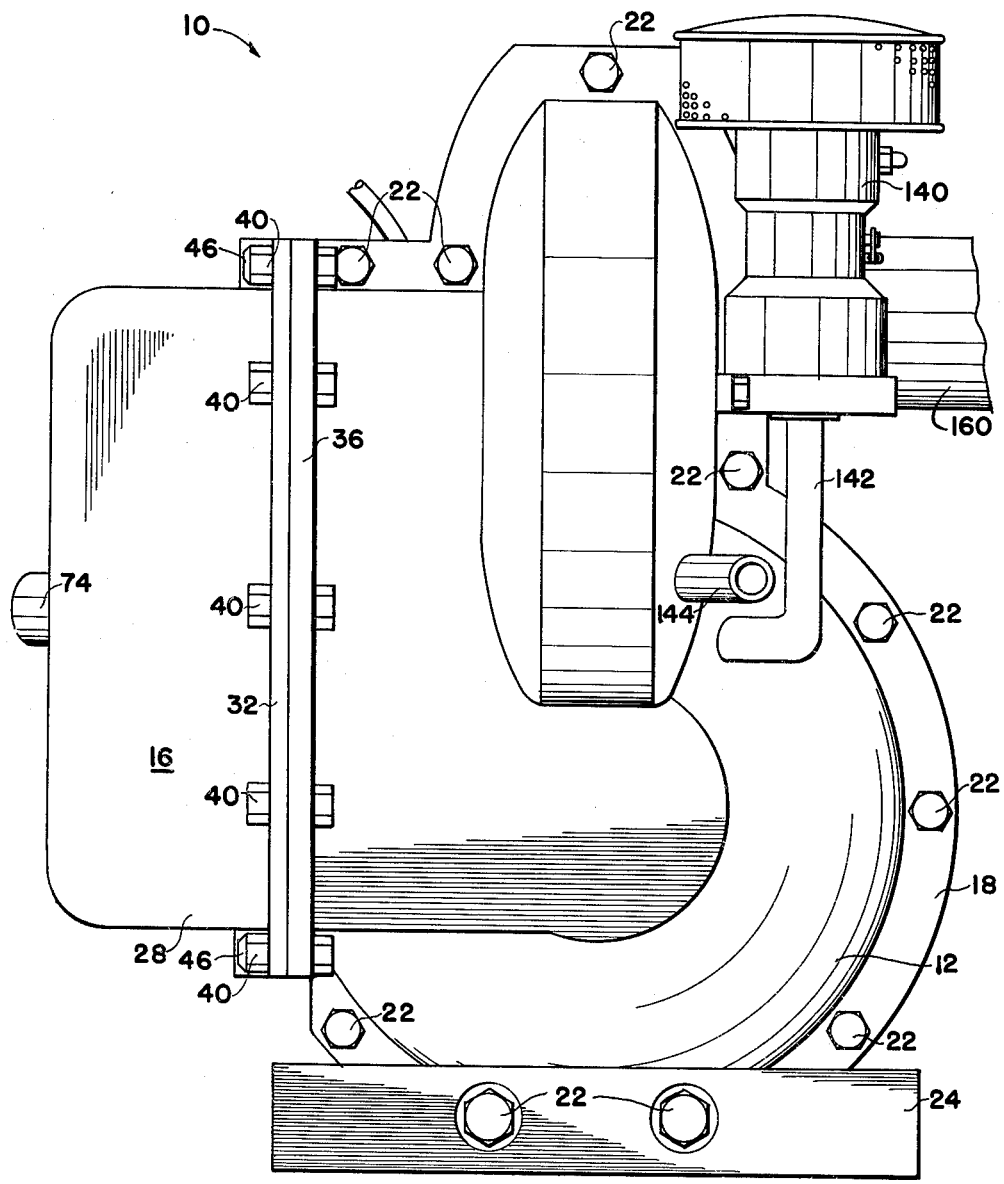
FIG. 1 is a side elevation view illustrating a preferred specific embodiment of the rotary internal combustion engine of the invention.

The following is a discussion and description of preferred specific embodiments of the new rotary internal combustion engine of the invention, such being made with reference to the drawings whereon the same reference numerals are used to indicate the same or similar parts and/or structure. It is to be understood that such discussion and description are not to unduly limit the scope of the invention.

Referring now to the drawings in detail, a preferred specific embodiment of the rotary internal combustion engine of the invention is shown generally at 10 and includes a housing which is preferably constructed of three separate portions 12, 14 and 16. The housing portions 12 and 14 are preferably provided with lip or flange portions 18 and 20, respectively, through which mounting bolts 22 are passed to firmly secure the portions together. The housing portions 12 and 14 are also desirably provided with outwardly extending edge portions 24 and 26 respectively, which are coplaner and in abutting relation when the housing sections 12 and 14 are secured together to form a mounting plate which is approximately at right angles to the main portion of the housing portions. Holes 25 are preferably provided in the mounting plate to mount the engine on a suitable support (not shown).

The housing portion 16 is preferably provided with two separate rounded members 28 and 30 which have lip or flange portions 32 and 34, respectively, positioned in mating relation with lips or flanges 36 and 38 of the housing portions 12 and 14, respectively, and are held in position by suitable mounting bolts 40 passing therethrough. The members 28 and 30 can also be provided with flange or mounting portions 42 and 44 respectively which receive mounting bolts 46 to hold the other edge portions of the housing portion 16 in assembled relation. The members 28 and 30 are preferably shaped to, when mounted on the housing portions 12 and 14, define therewith a hollow gearbox or the like referred to generally at 48 which can be provided with suitable lubricating materials or fluids for lubricating the gears positioned therein as described hereinafter.

Figure 2:
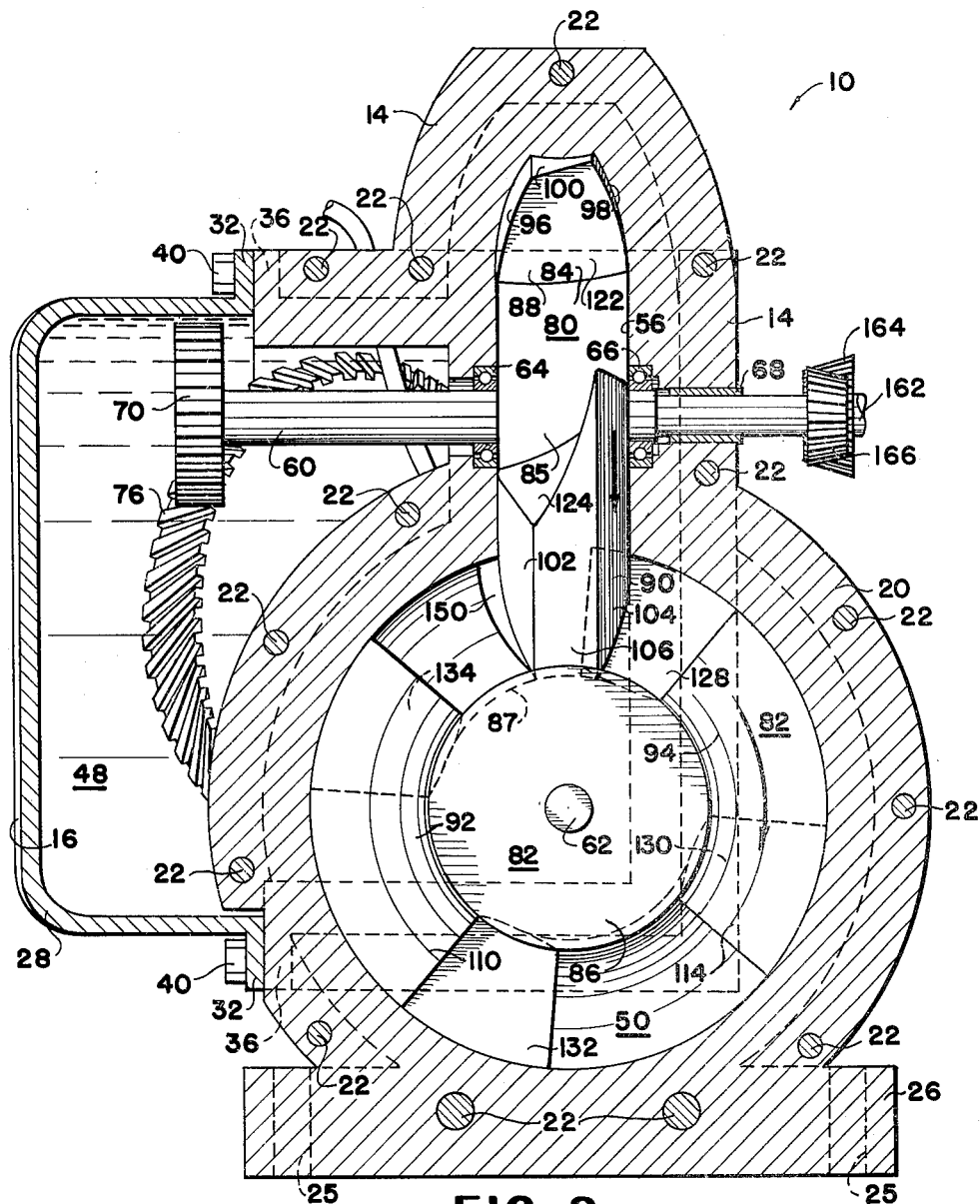
FIG. 2 is a cross-section view taken along the line 2—2 of FIG. 3.

Each of the housing sections 12 and 14 have a lower circular recess therein as shown at 50 and 52, respectively, and upper semi-circular recesses as shown at 54 and 56, respectively, the upper and lower recesses meeting. The recesses 50, 52, 54, and 56 are positioned in the housing 12 and 14 so that the upper recesses therein are in planes approximately perpendicular to the lower recesses and the recesses in the housing section are positioned so that when the sections 12 and 14 are secured together in assembled relation in the manner described hereinbefore the recesses define substantial circular cylinders in perpendicular planes and with the cylinders meeting in a common outer arcuate portion as best illustrated in FIG. 2. The cylinders defined by the recesses are preferably shaped so that the center portions thereof are substantially cylindrical in shape and the radially outer portions thereof have sides which taper inwardly to define a relatively narrow radially outer portion, the surface of the radially outer portion preferably being concave. The outer surface of the housing portions 12 and 14 preferably generally conform to the shape of the cylinders to aid in rapidly dissipating heat. The housing can be constructed to be liquid cooled, if desired.

Two elongated shafts 60 and 62 are journaled in the housing portions 12 and 14 by the use of suitable bearing means as shown at 64, 66 and 68 for the shaft 60. The shafts 60 and 62 are positioned in spaced relation and preferably the axes of the shafts are generally perpendicular to each other. The shaft 60 has one end portion coaxially positioned in the upper one of the cylinders formed by the housing portions and has the other end portion thereof positioned in the gear box 48. A bevel gear 70 is preferably provided and secured to the end portion of the shaft 60 in the gearbox 48. The shaft 62 has one end portion coaxially positioned in the lower one of the cylinders formed by the housing portions and has the other end portion thereof positioned in the gear box 48 and a bevel gear 72 is preferably rigidly secured to the end portion of the shaft 62 in the gear box. A transmission shaft 74 is preferably provided and is rotatably mounted in one end portion in the housing portion 16 and can be journaled between the sections 28 and 30 thereof. The shaft 74 has an inner end portion positioned in the gearbox 48 and located between the end portions of the shafts 60 and 62 therein. A relatively large bevel gear 76 is rigidly mounted on the end portion of the transmission shaft 74 in the gear box 48 and in operation meshes with the bevel gears 70 and 72 on the shafts 60 and 62, respectively, to turn the transmission shaft and the shafts 60 and 62 in unison. With this arrangement power is normally taken from the engine by the shaft 74, however, drive means can be directly connected to the shafts 60 or 62, if desired.

Two rotors 80 and 82 of like construction are provided and are positioned within the cylinders formed by the housing portions 12 and 14 and rigidly mounted on shafts 60 and 62, respectively, to turn therewith. The rotors 80 and 82 have generally cylindrical center portions as shown at 84 and 86, respectively, with the outer surfaces 85 and 87 thereof preferably being concave in transverse cross section. The rotors each have piston portions of like construction projecting from the center portions, two diametrically opposed piston portions being preferably provided for each rotor as shown at 88, 90, 92 and 94. The piston portion 88 or rotor 80 has side surfaces 96 and 98 which taper inwardly from the center portion 84 of rotor 80 to a relatively thin radially outer surface 100, the surface 100 preferably being concave in transverse cross-section and arcuate from one end portion of the piston to the other end portion thereof. The piston portion 90 of rotor 80 has side surfaces 102 and 104 and a radially outer surface 106 which are shaped and constructed and positioned to be the mirror image of the piston portion 88. Likewise, the piston portions 92 and 94 of rotor 82 have similar tapered side surfaces 108, 110, 112 and 114 and radially outer surfaces 116 and 118. The center portions of the rotors 80 and 82 are of size so that they do not enter the common portion of the cylinders formed by the housing portions and the piston portions of each of the rotors pass through the common portions of the cylinders in use with the radially outer surfaces of the piston portions being in close fitting and sliding engagement with the radially outer surfaces of the center portions. The rotors 80 and 82 are of size and shape to substantially fill the cylinders.

The circumferential dimension of the piston portions and the shape of the end surfaces of each of the piston portions of each of the rotors is preferably such that the end surfaces are in close proximity to the end surfaces of the piston portions of the other rotor when they meet in the common portion of the cylinders to prevent interference between the piston portions and to transfer the combustible fuel as explained hereinafter. Preferably, each end surface of each of the piston portions is in the shape of a hyperbolic paraboloid such as shown at 120 and 122 for the piston portion 88 and at 124 for the piston portion 90 of the rotor 80, at 128 and 130 for the piston portion 94 and at 132 and 134 for the piston portion 92 of the rotor 82. As will be apparent from FIG. 2 of the drawings, the radially inner portion of the piston portions of the rotors extend a relatively short circumferential distance around the rotor in comparison with the radially outer surfaces of the piston portions.

The rotor 80 is rigidly mounted on shaft 60 and positioned in the upper cylinder in the housing as illustrated in the drawings and the rotor 82 is rigidly mounted on and turns with the shaft 62 and is positioned within the lower cylinder in the housing. The rotors 80 and 82 are preferably dimensioned relative to the cylinders to substantially fill same and be in close fitting and sliding engagement with the cylinder walls. The rotor surfaces and/or the cylinder walls can be hardened and/or chrome-plated, if desired, in order to reduce the sliding friction therebetween. Also, suitable anti-friction material such as polytetrafluoroethylene, can be provided on the rotor and/or cylinder walls to further reduce the friction.

A common carburetor 140 is provided and can be of any suitable construction and a conduit 142 is connected in one end portion to the outlet of the carburetor. The other end portion of conduit 142 is connected to the housing portion 12 and preferably communicates with the lower cylinder in the housing and opens thereinto to provide a fuel inlet positioned immediately clockwise of the common portions of the cylinders as illustrated in FIGS. 1 and 5–7. The fuel inlet in the lower cylinder of the engine is preferably located so that the piston portions of the rotor 82 in the lower one of the cylinders passes the fuel inlet immediately after passing through the common portion of the cylinders.

An exhaust pipe 144 is provided and is secured in one end portion to the housing and is in fluid communication with the upper one of the cylinders therein to receive and pass exhaust gases therethrough to the atmosphere. Preferably, the exhaust outlet is positioned on the housing portion 12 in fluid communication with the upper one of the cylinders and is adjacent to the common portions of the cylinders so that the piston portions of the rotor 80 will pass the exhaust outlet immediately prior to entering the common portion of the cylinders.

Means are provided with the engine 10 to ignite a combustible fuel. This means is preferably a common sparkplug 146 which is removably mounted in the housing portion 14 and has the firing end portion thereof opening into and in communication with the upper one of the cylinders adjacent to the common portion of the cylinders and located so that the piston portions of the rotor 80 passes the sparkplug immediately after passing through the common portion of the cylinders. The sparkplug can be activated by common timing means (not shown).

The housing portions 12 and 14 are shaped adjacent the common portions of the cylinders to define an arcuate recess or pocket 150 which opens into and faces the common portion of the cylinders and which is preferably relatively wide at its radially outer portion. The recess or pocket 150 is located so that the piston portions of the rotor 80 pass the pocket or recess 150 as they leave the common portion of the cylinders and the piston portions of the rotor 82 pass the pocket or recess 150 as they enter the common portions of the cylinders. The pocket or recess 150 serves as means to transfer the combustible fuel from the lower one of the cylinders to the upper one thereof immediately prior to the firing or igniting of the combustible fuel.

Suitable means are desirably provided to initially start the engine and such can be of the type commonly employed with internal combustion engines such as used with automobiles and the like. As illustrated in the drawings, this includes a starter motor 160 which has a shaft 162 with a bevel 164 rigidly secured thereto to turn therewith during the operation of the motor 160. Bevel gear 164 meshes with and turns a bevel gear 166 which is rigidly secured to a projecting end portion of the shaft 60 so that when the gears 164 and 166 are meshing the shaft 60 will be turned to thereby move the rotor 80 within the upper one of the cylinders and, through gears 76 and 72, also rotate shaft 62 and rotor 82.

Figure 3:
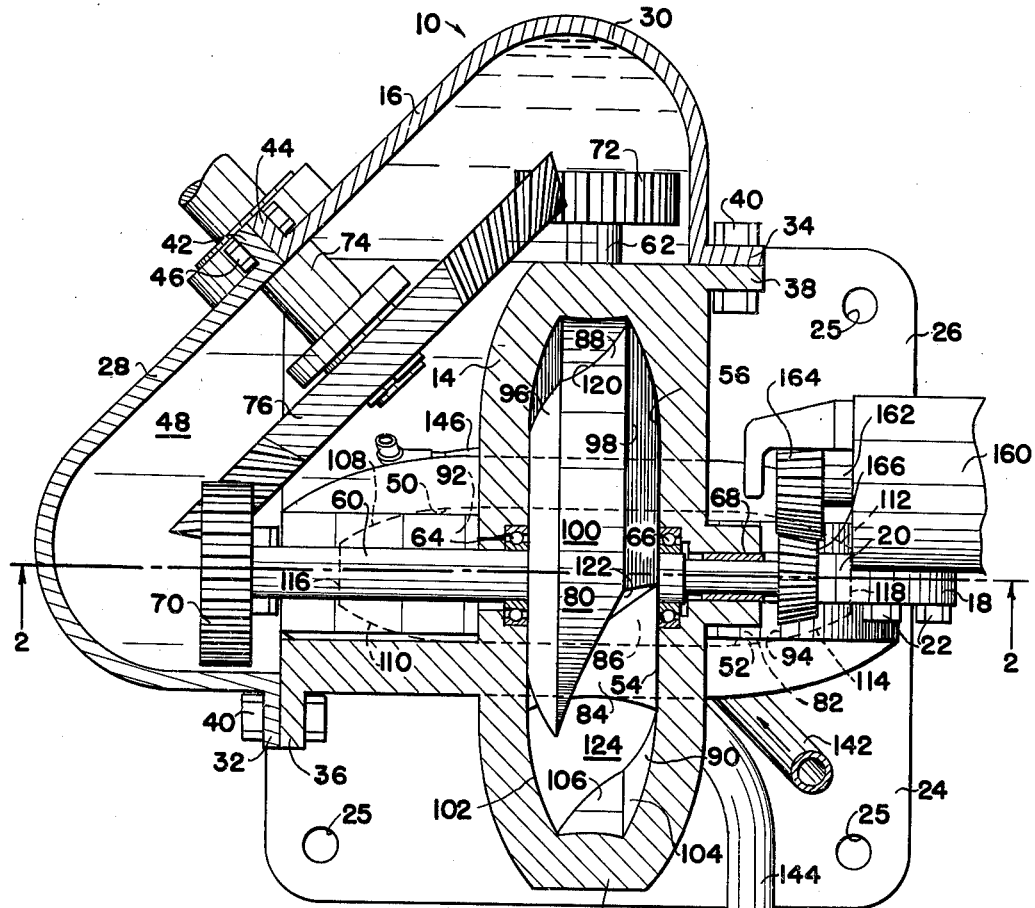
FIG. 3 is a transverse cross-section through the rotary internal combustion engine of FIG. 1.

FIGS. 5–8 diagrammatically illustrate a cycle of operation of the engine during the intake and firing of the fuel and exhausting of the exhaust gases. These figures diagrammatically illustrate the position of the piston portions of the rotors at various intervals of a cycle of the engine and are taken substantially in a plane passing through the common portion of the cylinders which is substantially parallel to the plane of FIG. 3. With the piston portions 90 and 92 of the rotor in the position illustrated in FIG. 5, that is, with the piston portion 92 having the leading end thereof in sliding engagement with the trailing end of the piston portion 90 and with the end surfaces of the piston portion being approximately half through the common portions of the cylinders, then combustible fuel can be supplied by the carburetor 140 through conduit 142 into the lower cylinder as defined by the recesses 50 and 52 in the housing portions. Fuel will continue to be supplied through the conduit 142 until the piston portion 92 moving in the direction indicated by the arrows passes the fuel inlet and closes the opening or communication between the conduit 142 and the lower one of the cylinders. This has occurred when the piston portions are in the positions illustrated in FIG. 6 of the drawings. The combustible fuel which was received by the lower one of the cylinders is pushed or moved by the leading end of the piston portion 92 around the lower cylinder in a clockwise direction.

Figure 5:
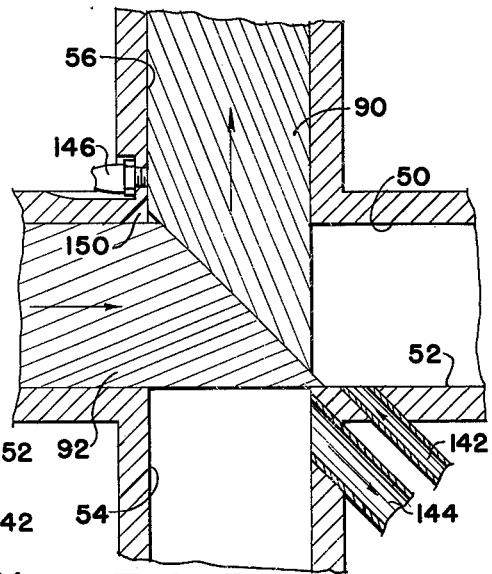
FIG. 5 is a diagrammatic view through the common portion of the two cylinders illustrating the position and direction of rotation of the piston portions of the rotors therein as the fuel passes from one of the cylinders into another of the cylinders and as additional fuel is received by the engine.
Figures 7, 8:
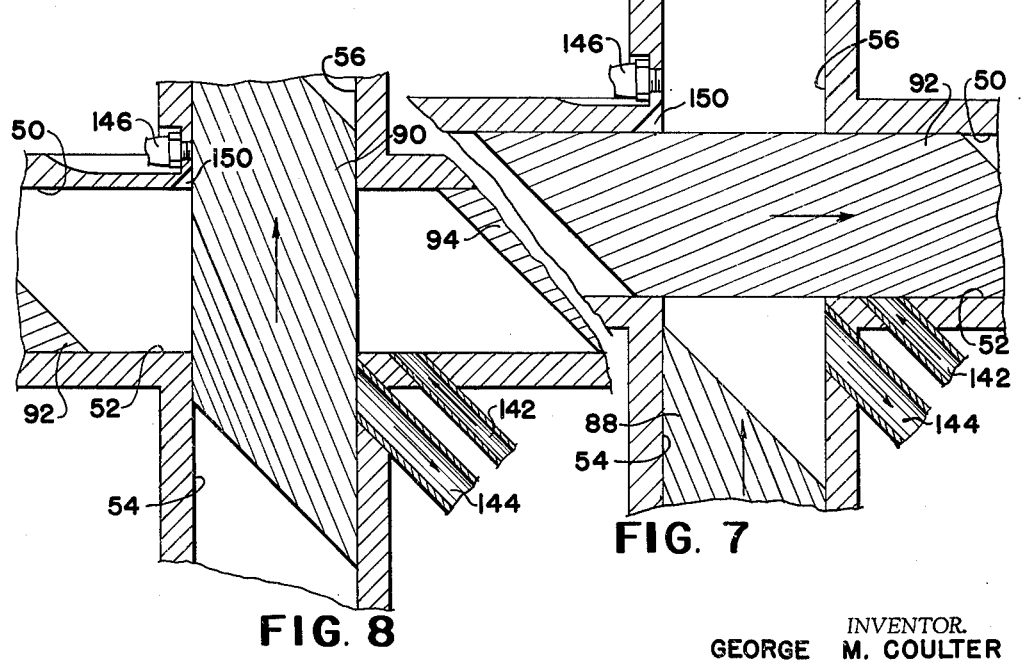
FIG. 7 is a diagrammatic view similar to FIG. 5 illustrating the position of the rotors during the final phase of the exhausting of the exhaust gases from the cylinder and immediately prior to commencing compression of the combustible fuel.
FIG. 8 is a diagrammatic view similar to FIG. 5 showing the position of the rotors during compression of the combustible fuel.

As the piston portion 92 approaches the common portion of the cylinders as shown in FIG. 8, the piston portion 90 of rotor 80 is passing through and substantially filling the common portion of the cylinders and the combustible fuel occupies the space between the leading end or face of the piston portion 92 and the side surface of the piston portion 90 and as rotation of the piston portions continues the fuel is compressed. Movement of piston portions 90 and 92 in the direction shown by the arrows in FIG. 8 continues the compression of the combustible fuel until the piston portions are both positioned within the common portion of the cylinders as shown in FIG. 5, that is, with the leading end or surface of piston portion 92 in sliding and close fitting engagement with the trailing end surface of piston portion 90. When the piston portions reach the position illustrated in FIG. 5 the combustible fuel is compressed to its maximum extent and it is substantially entirely contained within the arcuate recess or pocket 150. While the rotors are moving from the position illustrated in FIG. 8 to the position illustrated in FIG. 5 additional fuel is drawn into the lower one of the cylinders by operation of the carburetor and this is facilitated by a partial vacuum created in the lower one of the cylinders due to the piston portion 94 moving away from the side surface of the piston portion 90.

Figure 6:
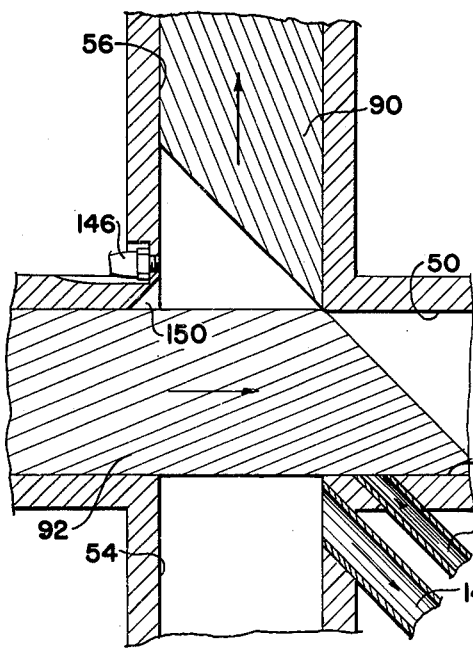
FIG. 6 is a diagrammatic view similar to FIG. 5 illustrating the position of the rotors at the time of ignition of the combustible fuel in one of the cylinders.

When the piston portions reach the position illustrated in FIG. 6 of the drawings the fuel inlet is closed and the piston portion 92 is now positioned within the common portion of the cylinders and the piston portion 90 has just passed the common portion of the cylinders and is contained entirely within the upper cylinder. The fuel has been transferred from the lower cylinder through recess 150 into the upper cylinder and the fuel is then between the trailing end surface of piston 90 and the side surface of the piston 92. The spark plug 146 is then fired and the combustible fuel is ignited. The explosion of the fuel causes the piston portion 90 and rotor 80 to be driven around the cylinder since at the time of ignition the combustible fuel is contained within a substantially closed compartment defined by the end surface of the piston 92, the side wall of the piston portion 92, and the walls of the upper cylinder, the piston portion being the only movable wall of this compartment. Movement of the piston portion 90 of rotor 80 causes rotation of shaft 60 which is transmitted through bevel gears 70 and 76 to drive the transmission shaft 74 and also through bevel gear 72 to drive the shaft 62 and turn the rotor 82 so that the rotors 80 and 82 are turned in unison. The firing of the spark plug 146 and the driving of the upper rotor 80 occurs twice during each revolution of the rotors or during each cycle of operation of the engine.

The exhaust gases are moved around the upper cylinder by the leading end of the piston portions of the rotor 80 and the gases are forced from the upper cylinder into the exhaust pipe 144 by the leading end of the piston portions of the rotor 80 as they approach the common portion of the cylinder. This is best illustrated in FIG. 7 of the drawings where the leading end of the piston 88 is moving the exhaust gases created by the explosion of the combustible fuel on the trailing end of the piston portion 90 as illustrated and described in connection with FIG. 6. When piston 88 approaches the common portion of the cylinders the piston portion 92 will then occupy the common portion of the cylinders and the exhaust gas is forced into the exhaust pipe 144. The exhaust pipe 144 is preferably located as closely as possible to the common portion of the cylinders so that substantially all of the exhaust gases are exhausted through pipe 144.

Figure 4:
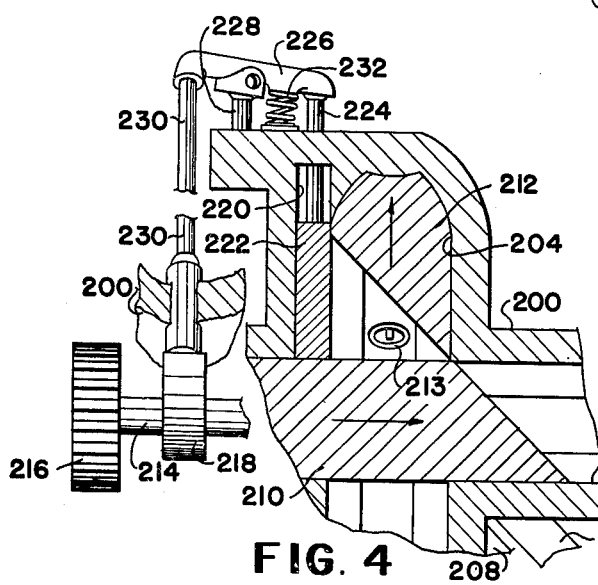
FIG. 4 is a partial cross-section view through an embodiment of the invention illustrating preferred construction and location of valve means therein.

In the engine as described hereinbefore the pocket or recess 150 provides means whereby the combustible fuel can be transferred from one of the cylinders, that is the lower cylinder, to the other of the cylinders. If desired, this means can be provided by a valve structure such as illustrated in FIG. 4 of the drawings. In this embodiment, a housing is shown generally at 200 and has a lower cylinder 202 and an upper cylinder 204 formed therein with the housing and the cylinders being of a suitable construction, such as that described hereinbefore. Fuel inlet means are provided at 206 and the conduit 206 can be supplied with fuel by a carburetor or the like such as shown at 140 in the previous embodiment. An exhaust pipe 208 is provided and is in fluid communication with the upper one of the cylinders 204 to receive and pass exhaust gases therethrough in operation. Piston portions 210 and 212 of the rotors are shown positioned in the cylinders 202 and 204, respectively, and the the piston portions and rotors are preferably constructed in the manner previously described. Means are provided to ignite a combustile fuel and such is preferably a spark plug 213 which is desirably positioned in the outer wall of the cylinders as shown. Shaft 214 mounts one of the rotors and has a bevel gear 216 secured thereto to be engaged with the other gearing means or the like so that the rotors are turned in unison. Shaft 214 also has a roller or member 218 thereon which is mounted or eccentrically shaped on the outer surface to in operation provide a cam.

A recess or pocket 220 is provided in the housing 200. The pocket or recess 220 is preferably relatively long and the side portion thereof is in communication with and opens directly into the upper cylinder 204 and the end portion of the pocket or recess 220 is in engagement with and opens directly into the lower cylinder 202. A valve member or operator 222 is positioned within the pocket or recess and slidable therein and a pushrod or the like 224 is connected in its end portions to the valve operator 222 and to one end of a rocker arm 226. Rocker arm 226 is pivotally mounted in its intermediate portion on a support member 228 on the housing and the other end portion of the rocker arm 226 is secured to the upper end portion of a pushrod or the like 230. The intermediate portion of pushrod 230 is mounted in housing portion 220 and reciprocates therein as the lowermost end portion thereof engages the cam surface of the member 218. Suitable means, such as the helical spring 232, are preferably provided to bias the rocker arm to maintain the pushrod 230 in contact with the cam surface.

The member 218 is mounted on shaft 214 so that the cam surface thereof moves pushrod 230, rocker arm 226 and pushrod 224 so that the valve member 222 is extended or in the position shown in FIG. 4 when the piston members are in the position illustrated, that is, in firing position. When the piston members 210 and 212 are moved to a position such as illustrated in FIGS. 8 and 5 of the drawings, the cam surface is such as to cause the valve operator 222 to be retracted or opened to permit passage of the combustile fuel from the lower cylinder 202 to upper cylinder 204, the member 222 being moved to the closed position of FIG. 4 immediately prior to firing of spark plug 213. The force of the explosion of the fuel is thus directed against the side surface of member 222 and does not tend to move it from its closed position.

The embodiment of the invention illustrated in FIG. 4 of the drawings is constructed in the same or similar manner as that shown in FIGS. 1–3 and 5–8 of the drawings with the exception of the valve structure described hereinbefore. As a result of the use of the sliding valve member 222 the gas is transferred from the lower cylinder 202 to the upper cylinder 204 without being compressed and subsequently expanded to the extent required in the recess or pocket 150. Also, while shaft 214 can be one of the shafts mounting the rotors, such can also be a separately mounted cam shaft which is driven by gearing meshing with the bevel gear 216 in a suitable manner.

The engine constructions as described hereinbefore define only two cylinders and rotors having two opposed piston portions therewith. As will be apparent to those skilled in the art additional cylinders can be provided and each of the rotors in each of the cylinders can also have other numbers of piston portions with coacting pairs of rotors being constructed alike and having the same number of piston portions therewith.

While the invention has been described in connection with preferred specific embodiments thereof, it will be understood that this description is intended to illustrate and not to limit the scope of the invention which is defined by the claims.

I claim:
1. A rotary internal combustion engine comprising, in combination, a housing having three separate portions bolted together and including two portions having outwardly extending edge portions at the lower portions thereof forming a mounting plate and extending from said plate at approximate right angles thereto and each having a lower circular recess therein and an upper semi-circular recess therein at right angles to said lower recess, said recesses in said last-named housing portions being positioned in facing relation and forming two circular and hollow cylinders positioned in substantially perpendicular planes with said cylinders meeting in a common outer arcuate portion, the other portion of said housing being bolted to each of said first-named housing portions and projecting therefrom and forming therewith a gearbox, two elongated shafts journaled in said first-named housing portions, said shafts being in spaced relation and having the axis thereof generally perpendicular to each other, one of said shafts having one end portion thereof coaxially positioned in one of said cylinders and having the other end portion thereof positioned in said gearbox, a bevel gear rigidly secured to said other end portion of said one of said shafts, the other of said shafts having one end portion thereof coaxially positioned in the other of said cylinders and having the other end portion thereof positioned in said gearbox, a bevel gear rigidly secured to said other end portion of said other of said shafts, a transmission shaft rotatably mounted in said other portion of said housing and having an inner end portion positioned in said gear box between said other end portions of said first-named shafts, a relatively large gear rigidly mounted on said transmission shaft and meshing with said bevel gears to turn said transmission shaft and said first-named shafts in unison, two rotors, each of said rotors having a generally cylindrical center portion and two diametrically opposed piston portions of like construction projecting from said center portion, each of said piston portions having side surfaces tapering inwardly from said center portion of said rotor to a thin and arcuate radially outer surface, said last-named suface being concave in transverse cross section, each end surface of each of said piston portions being in the shape of a hyperbolic paraboloid, the radially outer surface of said center portion of said rotors being arcuate between said piston portions and concave in transverse cross section, each of said first-named shafts having one of said rotors rigidly mounted thereon and rotatable therewith, said rotors being positioned in said cylinders in said housing and substantially filling same with said radially outer surface of each of said piston portions of each of said rotors being in close fitting and sliding engagement with said radially outer surface of said center portion of the other of said rotors during rotation thereof, the leading end surfaces of said piston portions of each of said rotors meeting in said common portion of said cylinders in sliding and close fitting engagement with the trailing end surfaces of the other of said rotors upon rotation thereof, a carburetor with said housing, a conduit connected to the outlet of said carburetor and to said housing to provide a combustible fuel inlet in the side wall of said other of said cylinders adjacent and in spaced relation to said common portion of said cylinders with said piston portions of said rotor in said other of said cylinders passing through said common portion of said cylinders immediately prior to passing said fuel inlet, an exhaust pipe secured in one end portion to said housing and in fluid communication with said one of said cylinders adjacent and in spaced relation to said common portion of said cylinders with said rotor in said one of said cylinders passing said exhaust immediately prior to entering said common portion of said cylinders, a spark plug mounted in said housing and having the firing end portion thereof in communication with said one of said cylinders adjacent said common portion of said cylinders and with said piston portion of said rotor in said one of said cylinders passing said spark plug immediately after passing through said common portion of said cylinders, said housing having an arcuate recess therein adjacent said spark plug and in communication with both of said cylinders and opening to said common portion of said cylinders, said engine being constructed and adapted so that combustible fuel can be provided to said other of said cylinders through said fuel inlet and moved around said other of said cylinders by the leading end of said piston portion of said rotor therein and be compressed against said side surface of said piston portion of said rotor in said one of said cylinders and transferred through said arcuate recess in said housing to said one of said cylinders between the trailing surface of one of said piston portions of said rotor therein and said surface of said piston portion of said rotor in said other of said cylinders, whereupon said spark plug ignites said fuel to drive said rotor in said one of said cylinders, with same turning said shaft therewith and driving said transmission shaft and said shaft with said rotor in said other of said cylinders through said gears in said gear box, the exhaust resulting from ignition of said fuel being forced into said exhaust pipe by the leading surface of said piston portions in said one of said cylinders as same approaches said side surface of said piston portion of said rotor in said other of said cylinders.

2. A rotary internal combustion engine comprising, in combination, a housing having recesses therein defining two cylinders with said cylinders being positioned in substantially perpendicular planes and with said cylinders meeting in a common outer portion, two shafts rotatably mounted in said housing and extending into said cylinders, said shafts being in spaced relation and having the axes thereof generally perpendicular to each other, two rotors, each of said rotors having a center portion and two diametrically opposed piston portions of like construction projecting from said center portion, each of said piston portions being rotatable through said common portion of said cylinders and having the leading and trailing end surfaces thereof shaped and of size to be in sliding engagement with the surfaces of the other of said rotors when passing through said common portion of said cylinders, each of said shafts having one of said rotors mounted thereon and rotatable therewith with said rotors positioned in and substantially filling said cylinders, an exhaust outlet with said housing operable to receive and pass therethrough exhaust gases from said cylinders, means positioned on said housing operable to ignite a combustible fuel in said cylinders, a fuel inlet into said cylinders positioned in spaced relation to said common portion of said cylinders, a pocket in said housing in fluid communication with each of said cylinders and positioned to receive and transfer combustible fuel from one of said cylinders to another of said cylinders immediately prior to igniting said fuel, a valve member slideably mounted in said pocket and operable to retract during passing of fuel therethrough and extend prior to igniting said fuel, a cam member operatively connected to one of said shafts for movement therewith, means with said valve member operably connecting same to said cam member with said cam member causing said valve member to be moved, said engine being constructed and adapted so that combustible fuel can be provided to said one of said cylinders and transferred therefrom through said pocket to said other of said cylinders and ignited therein to drive said piston portions of said rotor and said shafts.

3. A rotary internal combustion engine, comprising, in combination, a housing having two cylinders with said cylinders being positioned in substantially perpendicular planes and with said cylinders meeting in a common outer portion, two shafts rotatably mounted in said housing and extending into said cylinders, two rotors each having a center portion and opposed piston portions of like construction projecting from said center portion with said piston portions being rotatable through said common portions of said cylinders and having the leading and trailing end surfaces thereof shaped and of size to be in sliding engagement with the end surfaces of the other of the rotors when passing through said common portion of said cylinders, each of said shafts having one of said rotors mounted thereon with said rotors being positioned in said cylinders, fuel inlet conduit means operatively connected to said housing to provide fuel to one of said cylinders, exhaust gas conduit means operatively connected to said housing and in communication with the other of said cylinders to receive and discharge exhaust gases therefrom, means connected to said housing to ignite a fuel therein, an elongated generally channel shaped recess in said housing having a side portion thereof opening to one of said cylinders and having an end portion thereof opening to the other of said cylinders, a valve member slidably positioned in said recess and having a push rod secured to one end thereof and projecting through said housing, a rocker arm pivotally mounted in an intermediate portion on said housing and having one end portion thereof connected to the other end portion of said push rod, spring means with said rocker arm biasing same to retract said valve member, a cam member mounted on said shaft in said one of said cylinders and having an eccentric outer surface thereon, another push rod secured to the other end portion of said rocker arm and slidably engageable with said eccentric surface of said cam member to in operation extend and retract said valve member upon rotation of said one of said shafts, said valve member being retracted to permit combustible fuel to pass from said other of said cylinders into said recess and extendible to force fuel into said one of said cylinders behind said trailing edge of said piston portions therein immediately prior to igniting said fuel.

References Cited by the Examiner

UNITED STATES PATENTS

| | | | |
|---|---|---|---|
| 2,674,982 | 4/54 | McCall | 123—13 |
| 3,030,941 | 4/62 | Gedeit | 123—13 |
| 3,060,910 | 10/62 | McCall | 123—13 |

FOREIGN PATENTS 1,279,035  11/61  France.

KARL J. ALBRECHT, *Primary Examiner.*

JOSEPH H. BRANSON, JR., *Examiner.*